United States Patent

Komatsuki et al.

Patent Number: 6,089,295
Date of Patent: Jul. 18, 2000

[54] PNEUMATIC TIRE WITH CARCASS CORDS HAVING PARTICULAR VISCOELASTIC CHARACTERISTICS

[75] Inventors: Masato Komatsuki, Takasago; Shinichi Miyazaki, Kobe, both of Japan

[73] Assignee: Sumitomo Rubber Industries, Ltd., Hyogo-ken, Japan

[21] Appl. No.: 09/030,443

[22] Filed: Feb. 25, 1998

[30] Foreign Application Priority Data

Feb. 25, 1997 [JP] Japan .................. 9-41022

[51] Int. Cl.$^7$ ............... B60C 9/00; B60C 9/04; D02G 3/48
[52] U.S. Cl. ............... 152/556; 57/902; 152/451
[58] Field of Search ............... 152/451, 556, 152/527; 57/902, 236

[56] References Cited

U.S. PATENT DOCUMENTS 5,407,701  4/1995  Reuter ................. 152/527 X

OTHER PUBLICATIONS

Mechanics of Pneumatic Tires, ed. Samuel Clark:U.S. Dept. of Transportation, p. 27, Aug. 1981.

Primary Examiner—Adrienne C. Johnstone

[57] ABSTRACT

A pneumatic tire comprises a carcass ply made of cords each having a complex elastic modulus $E^*$ (kgf) and loss factor tan $\delta$ satisfying the following conditions: tan $\delta > 0$; tan $\delta \leq 0.001 \times E^* - 0.173$; tan $\delta \leq -0.0003 \times E^* + 0.174$; and $E^* \leq 340$, under a temperature of 120 degrees C.

6 Claims, 2 Drawing Sheets

PNEUMATIC TIRE WITH CARCASS CORDS HAVING PARTICULAR VISCOELASTIC CHARACTERISTICS

BACKGROUND OF THE INVENTION

1. Field of the Invention

The present invention relates to a pneumatic tire, including a carcass made of cords having special visco-elastic characteristics capable of improving running performance.

2. Description of the Related Art

Pneumatic tires for passenger cars, motorcycles and the like are usually provided with a carcass made of organic fiber cords such as nylon, polyester, rayon and the like for their lightweight nature and for riding comfort.

With respect to tensile elastic modulus and dimensional stability against heating during tire vulcanization, rayon cords are superior to the others. Therefore, rayon cords are widely used as carcass cords in the motorcycle tires to which stability during running is extremely important. The rayon material, however, has problems with its high hygroscopic properties and wastewater. Further, recent high-powered machines demand highly improved running performance from the tire.

SUMMARY OF THE INVENTION

Therefore, it is an object of the present invention to provide a pneumatic tire which, by making use of novel tire cords, running performance of the tire is improved over conventional rayon tire cords without the troublesome problems of high hygroscopic properties and wastewater.

According to one aspect of the present invention, a pneumatic tire comprises a tread portion, a pair of sidewall portions, a pair of bead portions, and a carcass ply made of cords extending between the bead portions, wherein each of the carcass cords has a complex elastic modulus E* in kgf and loss factor tan δ satisfying the following conditions:

$\tan \delta > 0$ $\tan \delta \leq 0.001 \times E^* - 0.173$ $\tan \delta \leq 0.001 \times E^* + 0.174$ $E^* \leq 340$ under a temperature of 120 degrees C.
Preferably, the cords are aramid cords whose fineness is less than 1110 dtex/2, but more than 200 dtex/2.

Preferred embodiments of the present invention will now be described in detail in conjunction with the accompanying drawings wherein:

DETAILED DESCRIPTION OF THE PREFERRED EMBODIMENTS

Figure 1:
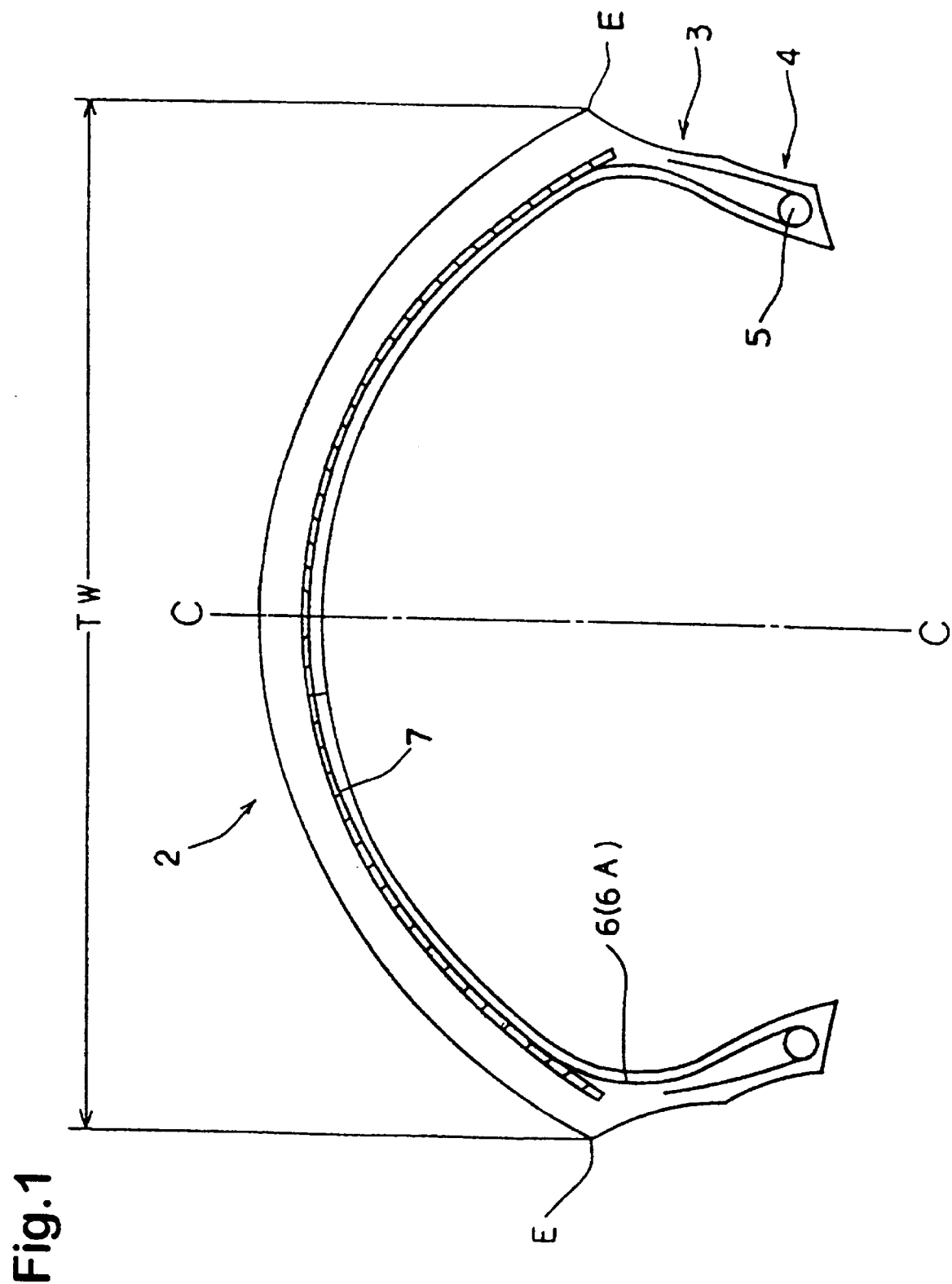
FIG. 1 is a cross-sectional view of an embodiment of the present invention.

The pneumatic tire according to the present invention comprises a tread portion 2, a pair of sidewall portions 3, a pair of bead portions 4 with a bead core 5 therein, and a carcass 6 extending between the bead portions 4.

Figure 2:
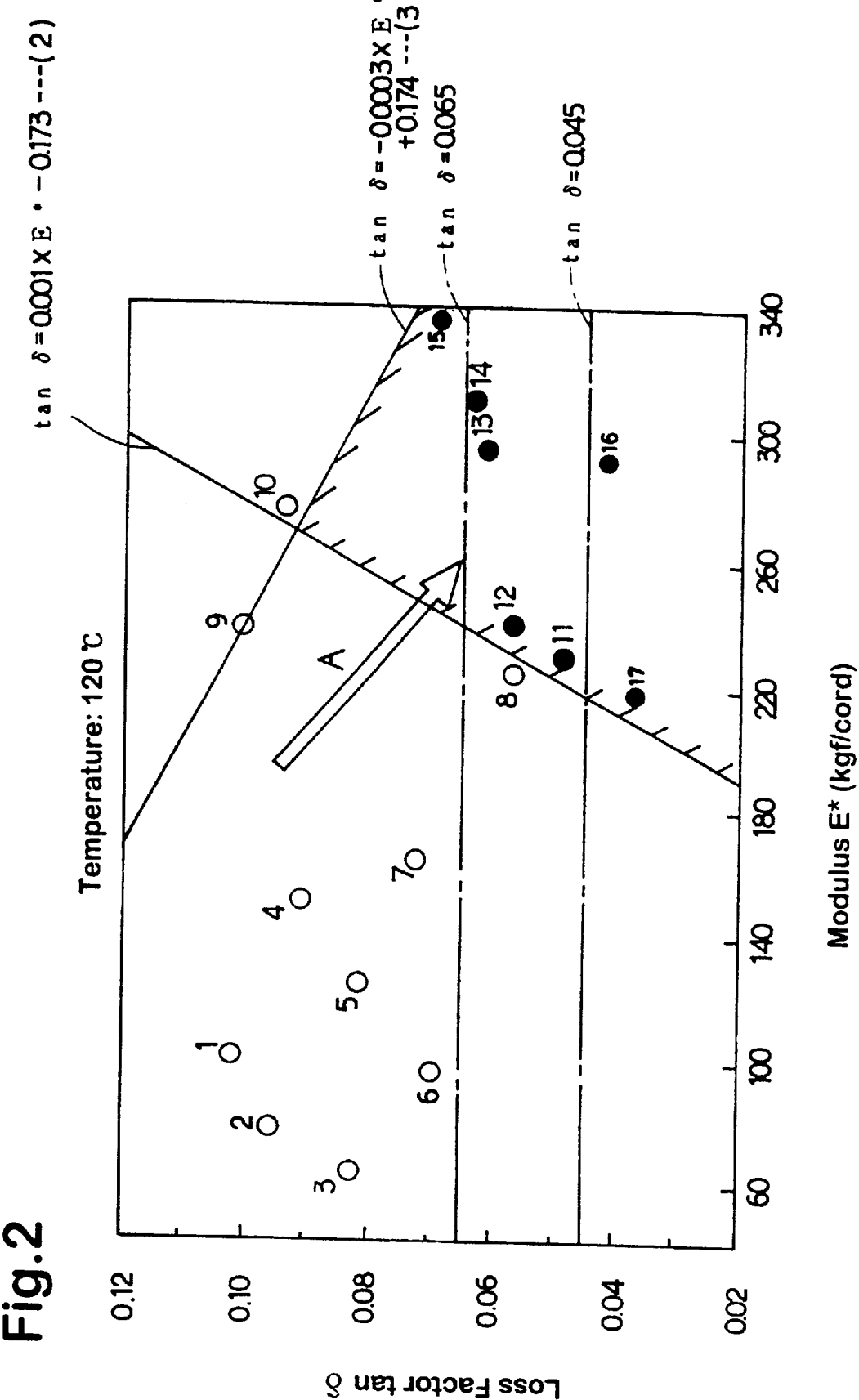
FIG. 2 is a graph showing a correlation of visco-elastic characteristics of carcass cords and running performance of the tire.

In FIG. 2, the tire is a motorcycle tire of which the tread 2 is curved continuously from one of the edges E to the other, so that the maximum cross-sectional width TW of the tire lies between the tread edges E, and in this example, the tread 2 has a substantially single radius of curvature.

The carcass 6 is composed of at least one ply 6A of cords arranged radially at an angle of 75 to 90 degrees to the tire equator C. In this example the carcass 6 is composed of a single ply 6A. Radially outside of the carcass 6, a jointless belt 7 is disposed, which is made of at least one cord wound spirally substantially parallel to the tire equator C.

According to the present invention, each carcass cord has a complex elastic modulus E* (kgf/cord) and a loss factor tan δ which satisfy the following conditions (1) to (4):

$$\tan \delta > 0 \tag{1}$$

$$\tan \delta \leq 0.001 \times E^* - 0.173 \tag{2}$$

$$\tan \delta \leq -0.0003 \times E^* + 0.174 \tag{3}$$

$$E^* \leq 340 \tag{4}$$

under a temperature of 120 degrees C.

It was believed that the visco-elastic character of the carcass cords alters the tire performance because the carcass cords embedded in the tire are periodically subjected to tensile stress during running. The present inventors measured various tire cords for visco-elastic characteristics, and various test tires having those cords as carcass cords were tested for running performance. The correlation between the visco-elastic character and running performance was investigated. As a result, the inventors discovered that a close correlation exists therebetween under a particular temperature of 120 degrees C. As for the visco-elastic characteristics, the complex elastic modulus E* (kgf/cord) and loss factor tan δ were measured in the temperature range of from 10 to 150 degrees C, using a visco-elastic spectrometer under the following conditions.

Initial tension: 450 g/cord
Frequency: 10 Hz
Dynamic distortion: plus/minus 0.03%
Temperature increasing speed: 2 degrees C/minute The results are shown in FIG. 2, wherein cord Nos. 1–10 plotted by white dots have been used as tire cords, but cord Nos. 11–14 plotted by black dots have not been used. The specifications thereof are as follows:

TABLE 1

| Cord No. | Material | Fineness | Twist/10 cm |
|---|---|---|---|
| 1 | PET(HMLS) | 1670 dtex/2 | |
| 2 | PET(ULS) | 1670 dtex/2 | |
| 3 | nylon 66 | 2100 dtex/2 | |
| 4 | polyarylate (*1) | 1670 dtex/2 | |
| 5 | vinylon | 1670 dtex/2 | |
| 6 | vinylon | 1330 dtex/2 | |
| 7 | PEN | 1670 dtex/2 | |
| 8 | rayon | 1840 dtex/2 | |
| 9 | aramid (*2) | 1670 dtex/2 | 55 |
| 10 | aramid (*2) | 1100 dtex/2 | 53 |
| 11 | aramid (*2) | 440 dtex/2 | 80 |

TABLE 1-continued

| Cord No. | Material | Fineness | Twist/10 cm |
|---|---|---|---|
| 12 | aramid (*2) | 800 dtex/2 | 72 |
| 13 | aramid (*2) | 800 dtex/2 | 60 |
| 14 | aramid (*2) | 800 dtex/2 | 75 |
| 15 | aramid (*2) | 800 dtex/2 | 50 |
| 16 | aramid (*2) | 220 dtex/2 | 68 |
| 17 | aramid (*2) | 220 dtex/2 | 90 |

(*1) KURARAY VECTRAN
(*2) DUPONT KEVLAR

Hitherto, it is believed that the running performance of a tire can be improved by increasing the complex elastic modulus E* of the carcass cords. However, as a result of the above-mentioned tests and study by the present inventors, it was discovered that the loss factor tan δ of the carcass cords also has a great influence upon the running performance. For instance, the cord No. 8 (rayon 1840 dtex/2) has a lower complex elastic modulus E* but a higher running performance than the cord No. 9 (aramid 1670 dtex/2), which contradicts the former knowledge. This result may be explained as follows.

When the rayon cords are loaded, they elongate easier than the aramid cords due to the relatively low complex elastic modulus E*, and when the load decreases the rayon cords easily return to the original state owing to the low hysteresis loss. In contrast, the aramid cords are hard to elongate due to the very high complex elastic modulus E*, and also hard to return to the original state due to the high hysteresis loss. The easily returning nature of rayon cords is regarded as being more effectual on the running performance, rather than the high resistance to elongation of aramid cords. Thus, it is very important to the running performance that the elongation resistance and returning power of the carcass cords are designed in a well-balanced manner.

Based on these concepts, the present inventors studied and discovered that it is necessary for improving the running performance to specifically define both the complex elastic modulus E* and loss factor tan δ of the carcass cords under a specific temperature of 120 degrees C.

In FIG. 2, the arrow shows a direction (A) in which tire-running performance becomes better when these cords are used as carcass cords. This shows that the cords plotted at the lower right generally display a better running performance.

The above-mentioned condition (2) defines a range in which a good running performance that is better than the rayon cord No. 8 can be obtained. That is, the extent in the direction (A) is defined.

The above-mentioned condition (3) gives the upper limit of the loss factor tan δ.

The condition (4) gives the realistic upper limit of the complex elastic modulus E*.

The aramid cord No. 10 (1100 dtex/2, final & first twist=53 turns/10 cm) has a relatively large loss factor tan δ although the complex elastic modulus is higher than the rayon cord No. 8. If this aramid cord is used in a carcass, the stability of the tire has a tendency to decrease, and a higher running performance than rayon cords cannot be obtained.

The cord Nos. 11 to 17 (black dots) are very fine aramid fiber cords whose fineness are less than 1100 dtex/2, for example, 800 dtex/2, 440 dtex/2, 220 dtex/2 and the like.

By the use of such very fine aramid fiber cords, it becomes possible to obtain the visco-elastic characteristics that satisfy the above-mentioned conditions (1) to (4).

If these very fine aramid fibers are twisted together into a cord by a large twist number, the elastic modulus is decreased, and therefore, it becomes difficult to satisfy the condition (2). However, if the twist number is too small, the loss factor increases and it becomes difficult to satisfy the equation (3).

For example, when the fineness is 800 dtex/2, the twist number is preferably in the range of 50 to 75 (turns/10 cm). When the fineness is 440 dtex/2, the twist number is preferably in the range of 53 to 85. When the fineness is 220 dtex/2, the twist number is preferably in the range of 57 to 95. The first twist number through the final twist number are preferably the same.

If the aramid fiber cords are less than 1100 dtex/2 as above, the twist coefficient T is set in the range of 1.0 to 2.5, preferably 1.9 to 2.5. Here, the twist coefficient T is $$T \approx n \times \sqrt{\frac{D}{1.44}} \times 10^{-3}$$

wherein 1.44 is the specific gravity of aramid,

D is the total dtex number of a cord, and n is the twist number (/10 cm) of the cord.

If the twist coefficient T is less than 1.0, the cord fatigue resistance decreases. If the twist coefficient T is more than 2.5, it becomes difficult to satisfy the above-mentioned conditions (2) and (3).

By the above-mentioned condition (4), the complex elastic modulus E* is limited to a range of not more than 340 kgf/cord. In the case of motorcycle tires, in order to obtain good ground contact without deteriorating ride comfort, the modulus E* is more preferably set to be not more than 320 kgf/cord, still more preferably not more than 310 kgf/cord. The loss factor tan δ is set in the range of 0.035 to 0.075, more preferably 0.045 to 0.065, still more preferably 0.05 to 0.06 to improve both the handling and tire rigidity.

By using the aramid cords, the problems of high hygroscopic properties and wastewater can be solved.

Comparison Test

Test tires (size 190/50ZR17) for motorcycles were made. The test tires had the same construction shown in FIG. 1 except for the carcass.

The test tires were mounted on the rear wheel of a 900 cc motorcycle of Japanese make, and the running performance such as handling, stability, ground contact, rigidity and ride comfort was evaluated into five ranks by the test rider's feeling.

Further, a durability test was made using a drum tester. The test tires were run for 13,000 km at a speed of 65 km/h under a load of 450 kgf and an inner pressure of 225 KPa, and then the tires were cut-open-inspected.

The tire specifications and test results are shown in Table 2.

As described above, in the pneumatic tires according to the present invention, as the carcass is made of novel cords satisfying the special conditions, the running performance and durability are further improved in comparison with the tires whose carcass is made of conventional cords such as rayon cords.

TABLE 2

| Tire | Prior | Ex. 1 | Ex. 2 | Ex. 3 | Ex. 4 | Ex. 5 | Ex. 6 | Ex. 7 |
|---|---|---|---|---|---|---|---|---|
| Cord material | rayon | aramid | aramid | aramid | aramid | aramid | aramid | aramid |
| fineness (dtex) | 1840/2 | 440/2 | 800/2 | 800/2 | 800/2 | 800/2 | 220/2 | 220/2 |
| Final twist (/10 cm) | 48 | 80 | 60 | 72 | 57 | 50 | 90 | 68 |
| First twist (/10 cm) | 48 | 80 | 60 | 72 | 57 | 50 | 90 | 68 |
| E* (kgf/cord) | 227 | 230 | 296 | 239 | 308 | 333 | 219 | 290 |
| tan δ | 0.055 | 0.048 | 0.06 | 0.056 | 0.063 | 0.069 | 0.038 | 0.043 |
| Condition (2)* | X | ○ | ○ | ○ | ○ | ○ | ○ | ○ |
| Condition (3)* | ○ | ○ | ○ | ○ | ○ | ○ | ○ | ○ |
| cord count (/5 cm) | 51 | 36 | 36 | 36 | 36 | 36 | 40 | 40 |
| Handling | 3.8 | 4.2 | 4.5 | 4.3 | 4.5 | 4.2 | 4 | 4.3 |
| Stability | 4.2 | 4.4 | 4.6 | 4.4 | 4.5 | 4.2 | 4.1 | 4.3 |
| Ground contact | 3.8 | 4.2 | 4.3 | 4.3 | 4.3 | 4.1 | 4 | 4.1 |
| Figidity | 3.8 | 4.1 | 4.4 | 4.1 | 4.4 | 4.3 | 4 | 4.3 |
| Ride comfort | 3.7 | 4.3 | 4.2 | 4.3 | 4.1 | 3.9 | 4.1 | 4 |
| Durability | good | good | good | good | good | good | good | good |

| Tire | Ref. 1 | Ref. 2 | Ref. 3 | Ref. 4 | Ref. 5 | Ref. 6 | Ref. 7 | Ref. 8 |
|---|---|---|---|---|---|---|---|---|
| Cord material | PE | vinylon | PEN | polyarylate | aramid | vinylon | polyarylate | aramid |
| fineness (dtex) | 1670/2 | 1330/2 | 1670/2 | 1100/2 | 1100/2 | 1330/2 | 1100/2 | 1100/2 |
| Final twist (/10 cm) | 40 | 38 | 40 | 53 | 53 | 60 | 60 | 60 |
| First twist (/10 cm) | 40 | 38 | 40 | 53 | 53 | 60 | 60 | 60 |
| E* (kgf/cord) | 101 | 96 | 164 | 148 | 276 | 62 | 139 | 261 |
| tan δ | 0.102 | 0.069 | 0.071 | 0.089 | 0.093 | 0.058 | 0.086 | 0.09 |
| Condition (2)* | X | X | X | X | ○ | X | X | X |
| Condition (3)* | ○ | ○ | ○ | ○ | X | ○ | ○ | ○ |
| cord count (/5 cm) | 50 | 36 | 22 | 20 | 30 | 36 | 36 | 36 |
| Handling | 3.7 | 3.7 | 3.8 | 3.7 | 3.8 | 3.6 | 3.6 | 3.7 |
| Stability | 3.8 | 4 | 4.1 | 3.8 | 4.1 | 3.9 | 3.7 | 4 |
| Ground contact | 3.3 | 3.6 | 3.6 | 3.6 | 3.7 | 3.8 | 3.6 | 3.8 |
| Figidity | 3.5 | 3.6 | 3.7 | 3.5 | 3.8 | 3.4 | 3.4 | 3.7 |
| Ride comfort | 3.5 | 3.7 | 3.7 | 3.7 | 3.7 | 3.9 | 3.7 | 3.8 |
| Durability | good | poor | good | poor | good | good | poor | good |

*○ = satisfy, X = not satisfy

What is claimed is:

1. A pneumatic tire comprising a tread portion, a pair of sidewall portions, a pair of bead portions, and a carcass ply made of cords extending between the bead portions, wherein each said cord has a complex elastic modulus E* in kgf and loss factor tan δ satisfying $\tan \delta > 0$ $\tan \delta \leq 0.001 \times E^* - 0.173$ $\tan \delta \leq -0.0003 \times E^* + 0.174$ $E^* \leq 340$ under a temperature of 120 degrees C and a frequency of 10 Hz.

2. The pneumatic tire according to claim 1, wherein said cords are aramid fiber cords.

3. The pneumatic tire according to claim 1, wherein said cords are aramid cords whose fineness is less than 1100 dtex/2.

4. The pneumatic tire according to claim 3, wherein the twist coefficient $$T = n \times \sqrt{\frac{D}{1.44}} \times 10^{-3}$$

of the cords is in the range of 1.0 to 2.5, wherein 1.44 is the specific gravity of aramid, D is the total dtex number of a cord, and n is the twist number per 10 cm of the cord.

5. The pneumatic tire according to claim 1, wherein said cords are aramid cords whose fineness is more than 200 dtex/2 but less than 1100 dtex/2.

6. The pneumatic tire according to claim 5, wherein the twist coefficient $$T = n \times \sqrt{\frac{D}{1.44}} \times 10^{-3}$$

of the cords is in the range of 1.0 to 2.5, wherein 1.44 is the specific gravity of aramid, D is the total dtex number of the cord, and n is the twist number per 10 cm of the cord.

* * * * *